United States Patent
Goutoule et al.

(10) Patent No.: US 7,378,629 B2
(45) Date of Patent: May 27, 2008

(54) DETECTION DEVICE COMPRISING A PARABOLIC MIRROR AND USE OF SAID DEVICE IN AN OVERFLIGHT MACHINE

(75) Inventors: Jean-Marc Goutoule, Tournefeuille (FR); Carine Bredin, Toulouse (FR)

(73) Assignee: Astrium SAS, Paris (FR)

( * ) Notice: Subject to any disclaimer, the term of this patent is extended or adjusted under 35 U.S.C. 154(b) by 75 days.

(21) Appl. No.: 10/599,890

(22) PCT Filed: Apr. 11, 2005

(86) PCT No.: PCT/FR2005/000870

§ 371 (c)(1),
(2), (4) Date: Oct. 12, 2006

(87) PCT Pub. No.: WO2005/103756

PCT Pub. Date: Nov. 3, 2005

(65) Prior Publication Data

US 2007/0194977 A1    Aug. 23, 2007

(30) Foreign Application Priority Data

Apr. 13, 2004    (FR) .................................. 04 03846

(51) Int. Cl.
*G01C 21/02*    (2006.01)
*H01J 3/14*    (2006.01)

(52) U.S. Cl. .................................... 250/203.6; 250/216
(58) Field of Classification Search ................ 250/221, 250/214.1, 203.6, 203.1, 206.1, 216; 356/4.01; 701/223, 200; 343/705, 708, 753–755, 761; 342/25 R, 25 A–25 F
See application file for complete search history.

(56) References Cited

U.S. PATENT DOCUMENTS

| 5,350,911 | A | * | 9/1994 | Rafanelli et al. | ......... 250/201.9 |
|---|---|---|---|---|---|
| 5,351,060 | A | * | 9/1994 | Bayne | ........................ 343/766 |
| 5,373,151 | A | * | 12/1994 | Eckel et al. | ............. 250/208.1 |
| 6,295,034 | B1 | * | 9/2001 | Brown et al. | ......... 343/781 CA |
| 6,606,066 | B1 | * | 8/2003 | Fawcett et al. | ............. 343/725 |
| 6,707,052 | B1 | * | 3/2004 | Wild et al. | .............. 250/504 R |

(Continued)

FOREIGN PATENT DOCUMENTS

EP    0 638 956 A1    2/1995

OTHER PUBLICATIONS

Raney et al., "Radarsat," Proceeding of the IEEE, vol. 79, No. 6, pp. 839-849 (Jun. 1991).

(Continued)

*Primary Examiner*—Que T. Le
*Assistant Examiner*—Pascal M Bui Pho
(74) *Attorney, Agent, or Firm*—Miller, Matthias & Hull

(57) ABSTRACT

The invention relates to a detection device, comprising a parabolic mirror (1) and several radiation detectors (2-5). The detectors are placed in the focal plane (O, X'-X, Y'-Y) of the mirror with respective spacings in a common fixed direction (Y'-Y). The detection device further comprises a selector system, connected to each of the detectors (2-5), embodied to successively select each of the detectors and to transmit a received signal from the selected detector. The separations of the detectors (d2-d5) are selected such that a gain diagram, for the reception of said device, has a gain minimum, between two successive gain maxima, each corresponding respectively to one of the detectors, of less than 3.0 dB less than said gain maxima. Such a device permits a sweeping of a zone with several adjacent sub-sweeps from a machine overflying said zone.

11 Claims, 5 Drawing Sheets

U.S. PATENT DOCUMENTS

2002/0008669 A1    1/2002  Muhlhauser et al.
2006/0290585 A1*  12/2006  Welch ................. 343/781 CA

OTHER PUBLICATIONS

Martins-Camelo L et al., "Reflector Antenna with Switchable Shaped Beams for a Space-Based Sar," IEEE, XP-002302913, pp. 145-148, (1985).

Rotti et al, "SnowSat—A Ku-band SAR Mission for Climate Research and Hydrology," IEEE, XP010705224, pp. 1901-1903, (2003).

International Search Report PCT/FR2005/00870; report dated Dec. 8, 2005.

* cited by examiner

DETECTION DEVICE COMPRISING A PARABOLIC MIRROR AND USE OF SAID DEVICE IN AN OVERFLIGHT MACHINE

CROSS REFERENCE TO RELATED APPLICATION

This is the U.S National Phase of International Application No PCT/FR05/00870, filed Apr. 11, 2005, the entire disclosure of which is incorporated by reference.

FIELD OF THE DISCLOSURE

The present invention relates to a detection device with parabolic mirror., It relates in particular to such a device having operation of radar type, in particular operation of the synthetic aperture radar, or SAR standing for "Synthesized Aperture Radar", type.

BACKGROUND OF THE DISCLOSURE

Detection devices with parabolic mirror are commonly used to search for the presence of particular objects in a determined geographical zone. The objects searched for may, for example, be metal parts or heat sources. The detection device is then stowed on board an aircraft or a satellite which overflies the geographical zone concerned.

The geographical zone may be traversed according to a scan corresponding to the displacement of the overflight machine. This displacement defines a band in the geographical zone, called a sweep, which possesses a ground width, along a direction perpendicular to the displacement of the machine, and determined by the characteristics of the detection device and by the altitude of the machine. The direction of displacement of the overflight machine is commonly called the azimuth, and the direction perpendicular to the displacement is commonly called the elevation, or else distance. A width of sweep which is all the larger makes it possible to reduce the number of passes of the machine above the geographical zone, that are necessary in order to fully cover the latter with mutually adjacent sweeps.

To increase the width of sweep, certain known detection devices make it possible to vary the elevation of the direction of detection between several determined values. Each direction of detection thus adopted corresponds to a secondary ground band, situated inside the sweep and called a sub-sweep. The width of the sweep then corresponds to the sum of the widths of the sub-sweeps. A greater sweep width may thus be obtained. By way of example, a sweep width of greater than 400 kilometers is achievable using 5 sub-sweeps, A mode of operation of an SAR device which allows scanning with several sub-sweeps is called "ScanSAR", standing for "Scanning Synthesized Aperture Radars".

Among the known detection devices which allow detection in several directions, may be mentioned the electronic scanning antennas, also called "Active Antennas" An active antenna is constituted by a matrix of detectors and a control system linked to each of the detectors. The control system combines elementary reception signals delivered by all the detectors, applying a phase shift associated with the position of the corresponding detector in the matrix to each elementary signal. The whole set of phase shifts used defines the direction of detection. An identical principle is used for a matrix of radar transmitters, to obtain a radiation emission focused in a determined direction. Devices with active antennas exhibit very good performance, but their complexity and their cost constitute significant drawbacks.

Other detection devices are known, which incorporate a parabolic mirror and a detector placed at the focus of this mirror. These devices are much simpler, and consequently less expensive than the previous ones. In a device with parabolic mirror, the direction of detection is determined by the orientation of the mirror. This orientation may be modified either by a movement of the mirror with respect to the machine on board which the detection device is stowed, or by a roll movement of the machine itself during its displacement. In both cases, the direction of detection varies relatively slowly. Therefore, such a device is not suitably adapted for carrying out a scan of a geographical zone with several sub-sweeps.

It is also known to place an active antenna of reduced dimensions in the focal plane of a parabolic mirror, at the level of the focus of the mirror. The operation and the characteristics of such hybrid detection device result from a combination of the respective manners of operation and characteristics of the active antenna and of the parabolic mirror. In particular, phase shifts are again introduced between several detectors/transmitters of the active antenna which are simultaneously activated to obtain a determined direction of detection. However, such hybrid devices are again complex and expensive.

SUMMARY OF THE DISCLOSURE

The present disclosure proposes a simple and inexpensive detection device which makes it possible to effectively scan a geographical zone with several sub-sweeps.

To this end, the invention proposes a detection device comprising a parabolic mirror and several radiation detectors placed in a focal plane of the mirror. The focal plane is substantially perpendicular to an axis of the mirror and contains a focus of the latter. The detectors are positioned with respective offsets along a determined common direction parallel to the focal plane. The detection device furthermore comprises a selection system connected to each of the detectors and devised so as to successively select just one of the detectors and to transmit a reception signal originating from the selected detector. The respective offsets of the detectors in the focal plane of the mirror are chosen so that a reception gain diagram of said device exhibits, between two successive gain maxima in said diagram and corresponding respectively to one of the detectors, a gain minimum of less than 3.0 dB below each of said gain maxima.

In a detection device according to the invention, various directions of detection are obtained by virtue of the use of several detectors in combination with a parabolic mirror. The radiation received along each of these directions is focused onto one of the detectors by reflection off the mirror. Changes of direction of detection are obtained by means of the detectors selection system. Rapid changes of direction of detection may thus be obtained, in particular electronically, which make it possible to carry out an elevation-wise scan of an explored geographical zone. By virtue of the choice adopted for the offsets, the scan obtained comprises sub-sweeps parallel to the displacement of the detection device which are juxtaposed pairwise. No detectionless band separates two adjacent sub-sweeps: continuous detection may be performed over the whole width of the sweep.

It is specified that the selection system for a detection device according to the invention may be particularly simple, and hence inexpensive. Specifically, this selection system is designed so that only one of the detectors situated in the focal plane of the mirror is activated at each instant. The other detectors are then deactivated. The direction of detection is therefore fixed uniquely by the selection of the single activated detector, without introducing phase shifts between signals of several detectors.

An advantage of a detection device according to the invention results from the reduced number of detectors necessary. By way of example, a detection device according to the invention can comprise four or five detectors. This results in a significant reduction in the cost of the detection device relative to an active antenna, as well as a decrease in the weight of the device.

In a preferred manner, the respective offsets of the detectors in the focal plane of the mirror are chosen so that the gain minimum, situated between two successive gain maxima in said diagram and corresponding respectively to one of the detectors, is less than 1.5 dB below each of said gain maxima. An almost uniform detection sensitivity is thus obtained over the width of the sweep.

Optionally, the detectors may be disposed in an aligned manner in the focal plane of the parabolic mirror. A particularly simple mounting of the detectors in the focal plane results therefrom.

Furthermore, the detector selection system may be simplified, by virtue of the reduced number of detectors used. It may be adapted to select the detectors in a cyclic manner. A periodic transverse (or elevation-wise) scan of the sweep is thus obtained, which is distributed in a balanced manner between the sub-sweeps.

The selection system may also be adapted for selecting the detectors in an increasing or decreasing order of the respective offsets of the detectors in the focal plane of the mirror. A progressive transverse (or elevation-wise) scan of the sweep is thus obtained, passing successively from a given sub-sweep to an adjacent sub-sweep. The detection device is then compatible with commercially available software for reconstructing the geographical zone explored.

According to the preferred embodiment of the invention, the detection device is adapted to operate for radar. To do this, each detector is adapted to operate for emission or reception of radiation. Such a detector is then commonly called a source. The selection system is then devised so as to furthermore transmit an emission signal to the selected detector. More particularly, the detection device may be specifically adapted to operate for synthetic aperture radar.

In the case of radar operation, the detection system may have the following particularly simple structure. It may comprise several branches each connected to an input and to an output of the selection system, each detector being connected to one of the branches. Each branch comprises selectors disposed at nodes of said branch. Each selector is devised so as to reproduce an emission signal intended for one of the detectors on an output of said selector, selected as a function of an emission selection signal transmitted on a control input of said selector, then so as to reproduce a reception signal originating from said detector and transmitted on an input of said selector, selected as a function of a reception selection signal transmitted on the control input of said selector.

The invention also relates to a use of a detection device as described above on board a machine for overflying a geographical zone in which the detection is effected. The selection of the detectors then forms a complete scan of a sweep of said zone in combination with the displacement of the overflight machine. The expression a complete scan of a sweep is understood to mean a scan in which the ground fields covered successively for one and the same direction of detection, that is to say the successive fields belonging to one and the same sub-sweep, are adjoining or mutually overlapping in the azimuth direction. A sub-sweep is then completely covered during a single pass of the overflight machine. Preferably, the detection device is oriented in such a way that the direction of offset of the detectors in the focal plane of the parabolic mirror is substantially perpendicular to the azimuth direction. A maximum sweep width is thus obtained.

BRIEF DESCRIPTION OF THE DRAWING

Other features and advantages of the present invention will become apparent in the following description of two nonlimiting exemplary embodiments, with reference to the appended drawings, in which.

DETAILED OF THE DISCLOSURE

Figure 1:
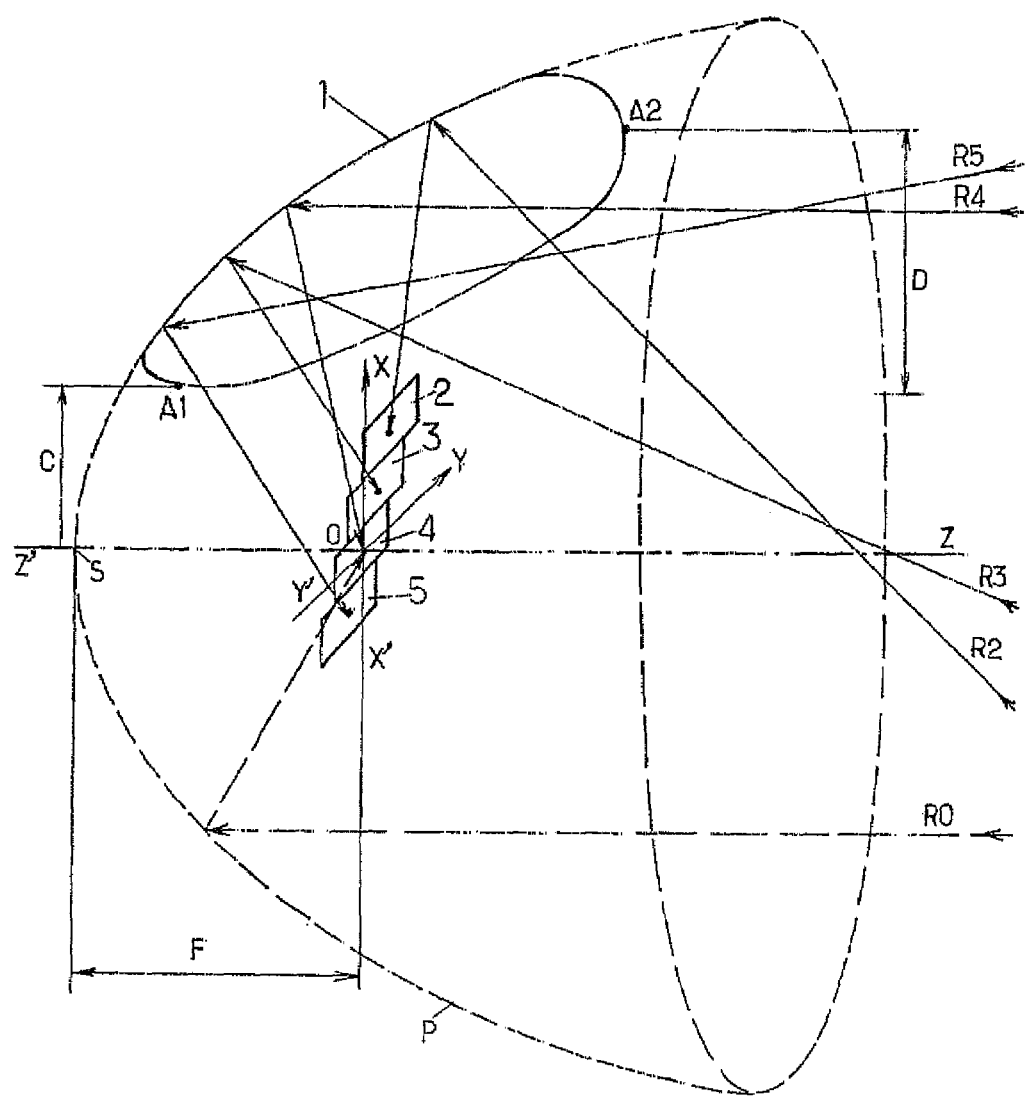
FIG. 1 is a perspective diagram of a detection device according to the invention.
Figure 2:
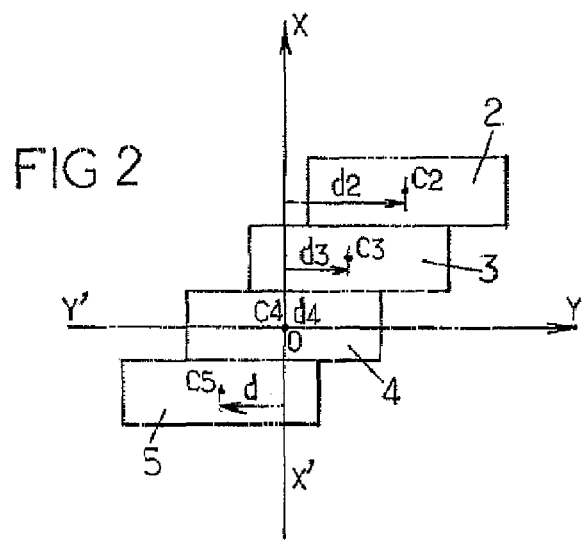
FIG. 2 illustrates an exemplary disposition of the detectors for a detection device according to FIG. 1, comprising four-detectors.
Figure 4:
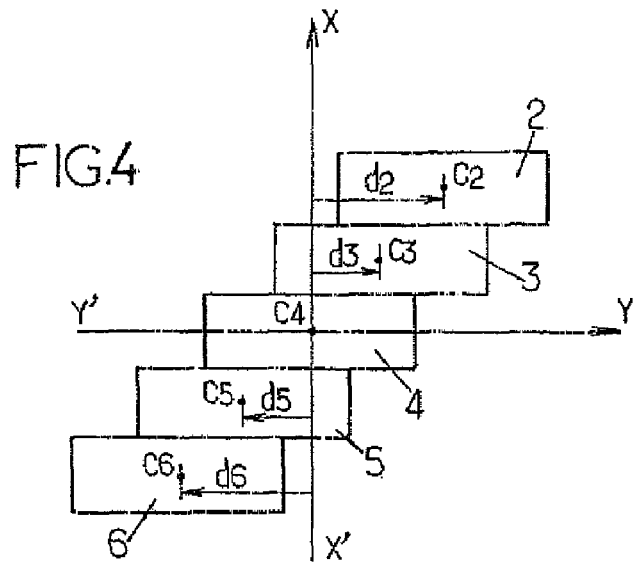
FIG. 4 corresponds to FIG. 2 for a detection device according to the invention comprising five detectors.

For the sake of clarity, the dimensions of the elements represented in FIGS. 1, 2 and 4 do not relate to actual dimensions. Furthermore, identical references used in several figures designate identical elements.

The invention is now described in detail within the framework of a synthesized aperture radar (SAR).

In accordance with FIG. 1, the parabolic mirror 1 corresponds to a part of a paraboloid of revolution referenced P, with axis Z'-Z and focus O. The mirror 1 corresponds to a substantially elliptical shape, inscribed within the surface area of the paraboloid P. The distance between the axis Z'-Z and the point A1 of the periphery of the mirror 1 closest to this axis is called the guard diameter or "clearance". It is denoted C. D is the projected diameter of the mirror 1 between the point A1 and the point A2 of the periphery of the mirror 1 opposite A1. By way of example, C may be equal to 20 cm and D may be equal to 1 meter. The mirror 1 consists of a material having a high electrical conductivity, such as aluminum, for example.

According to the known geometrical laws, a radiation R0 entering the paraboloid P parallel to the Z'-Z axis is reflected off the internal face of the latter and converges to the focus O. The distance F between the focus O and the vertex S of the paraboloid P is called the focal distance of the mirror 1. It may be equal to 50 cm, for example.

The focal plane of the mirror 1 is the plane perpendicular to the Z'-Z axis which contains the focus O. A point in the focal plane is labeled by its Cartesian coordinates along two axes denoted X'-X and Y'-Y. The X'-X and Y'-Y axes are mutually perpendicular and cut one another at the focus O.

The detection device comprises several detectors, also used as sources of radiation in the case of a radar such as considered for this description. It may comprise for example four sources, referenced 2-5 in FIG. 1. The sources 2-5 are preferably all identical.

They may be of a type known to the person skilled in the art. Each source 2-5 comprises a radiation emission/detection cell and a frustoconical horn, or collector. Each horn possess a determined cross section, for example rectangular. The horn allows impedance matching between the cell and the exterior of the source.

FIG. 2 is a view of the sources 2-5 in the focal plane of the mirror 1. For the model of the sources that is considered here, each source exhibits a rectangular cross section in this plane. The wavelength of the radiation is 31 millimeters, and corresponds to a frequency of 10 GHz. The external dimensions of the cross section of a source in the focal plane of the mirror 1 may be, by way of example, 35 mm×110 mm. The sources 2-5 are disposed parallel to one another: their principal direction of emission/reception is oriented substantially towards the center of the mirror 1 The small side of the cross section of each source 2-5 in the focal plane is parallel to the X'-X axis and the large side of the cross section of each source 2-5 in the focal plane is parallel to the Y'-Y axis.

The sources 2-5 are disposed in the focal plane of the mirror 1 in such a way as to be pairwise contiguous, two contiguous sources being in contact along a part of one of their respective large sides. Alternatively, they may be disposed with an interval of separation along the X'-X axis between two neighboring sources.

The sources 2-5 are furthermore offset with respect to one another parallel to the Y'-Y axis, according to respective offsets denoted d2-d5 in FIG. 2. Each source 2-5 possesses a center of reference, respectively denoted C2-C5, which is the focus of the cell of this source. The foci C2-C5 are situated in the focal plane of the mirror 1. The offsets d2-d5 are respectively labeled with respect to the foci C2-C5, on the basis of the X'-X axis. Optionally, one of the sources (the source 4 in FIG. 2) is centered with respect to the focus O of the mirror 1: the corresponding offset is zero.

According to the optical laws of reflection on the internal surface of the parabolic mirror 1, each of the sources 2-5 is then associated with a direction of detection determined by the value of the offset of this source in the focal plane. More precisely, the focus Ci, for i=2-5, is the center of convergence of a radiation Ri entering the mirror 1 along the direction of detection of the source i (see FIG. 1) In the vocabulary of the person skilled in the art, the direction of detection of the radiation Ri is conjugate with the focus Ci of the source i.

By way of example of disposition of the sources in the focal plane of the mirror 1, in accordance with FIG. 2, the foci C2-C5 are aligned along an oblique direction with respect to the two axes X'-X and Y'-Y.

A successive selection of each of the sources 2-5 makes it possible to obtain a scan of the direction of detection of the device. This scan of the direction of detection possesses a component parallel to the Y'-Y axis. It consists of discrete jumps corresponding to the differences between the offsets of the successively selected sources.

Figure 3:
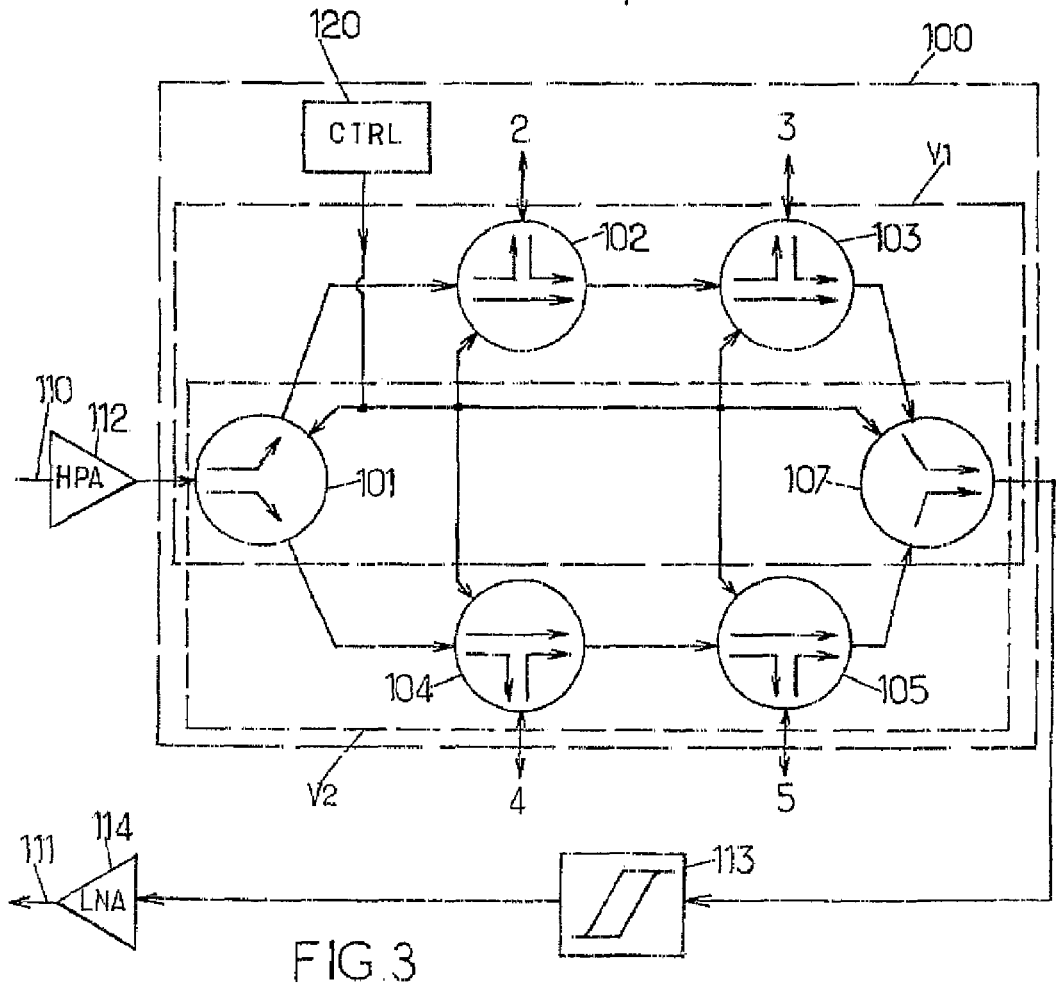
FIG. 3 is a functional diagram of a detector selection system that can be used in a detection device according to FIGS. 1 and 2.

The selection of each of the sources 2-5 may be performed by means of a selection system corresponding to the diagram of FIG. 3.

Such a selection system 100 comprises two branches, or pathways, referenced V1 and V2. The pathways V1 and V2 are disposed in parallel between an input selector 101 and an output selector 107. An input of the selector 101 is connected to a general input for signals 110 via a high-power amplifier 112, denoted HPA. The selector 101 possesses two outputs connected respectively to the inputs of the pathways V1 and V2. A signal received at input by the selector 101 is reproduced on one or the other of its outputs as a function of a selection signal applied to a dedicated control input of the selector 101. An output of the selector 107 is connected to a general output for signals 111 via a signal limiter 113 and via a low-noise amplifier 114, denoted LNA, The selector 107 possesses two inputs connected respectively to the outputs of the pathways V1 and V2. A signal received by the selector 107 on one or other of its two inputs is reproduced on the single output of the selector 107 as a function of a selection signal applied to a dedicated control input of the selector 107.

Each of the sources 2-5 is linked to one or other of the pathways V1 or V2 by a respective selector 102-105. Each selector 102-105 possesses an input and an output that are connected to the corresponding pathway V1 or V2, and a two-way connection, or input/output, linked to the corresponding source. Each of the selectors 102-105 possesses three states selected as a function of a selection signal applied to a dedicated control input of this selector. In a first state, the selector reproduces directly on its output a signal received on its input. The other two states relate to the two-way connection of this selector: in the second state the selector reproduces on its two-way connection a signal received on its input, and in the third state the selector reproduces on its output a signal received on its two-way connection. The two-way connection therefore has a function of output of the selector in the second state, and a function of input of the selector in the third state.

The control signals for the selectors 101-105 and 107 are produced by a command unit 120 for the system 100, denoted CTRL. The unit 120 is linked to the respective control inputs of the selectors by dedicated control links. The unit 120 is programmed to simultaneously address appropriate control signals to all the selectors 101-105 and 107. Thus, emission signals are transmitted successively to each of the sources 2-5 from the amplifier 112, and reception signals arising from each of the sources 2-5 are transmitted successively to the limiter 113.

By way of example, during a detection performed by means of the source 2, the selector 102 is firstly controlled so as to be in its second state, and the selector 101 is simultaneously controlled so as to reproduce on its output connected to the pathway V1 the signal received on its input. An emission signal amplified by the amplifier 112 is thus transmitted to the source 2.

A reception signal, associated with the previous emission signal during radar operation, and originating from the source 2 is thereafter transmitted to the limiter 113 in the following manner: the selector 102 is controlled so as to be in its third state and the selector 103 is controlled so as to be in its first state. Simultaneously, the selector 107 is controlled so as to reproduce on its output the signal received on its input connected to the pathway V1.

The command unit 120 is programmed to periodically repeat the control signals so that reception signals originating from each of the sources 2-5 are successively and cyclically transmitted to the limiter 113, to the amplifier 114 and to the output 111 of the system 100.

Each of the selectors 102-105 causes an absorption of a signal that it transmits. For a selection system 100 in accordance with FIG. 3, a reception signal arising from the sources 2 or 4 undergoes an absorption by an additional selector relative to a reception signal arising from the sources 3 or 5. Such an additional absorption may be compensated for, in a known manner, by an adaptation of the gain of the amplifier 114, said adaptation being controlled by the unit 120.

In a similar manner, the emission signals intended for each of the sources 2-5 undergo different absorptions within the selection system 100. These different absorptions may be compensated for by appropriate adaptation of the gain of the amplifier 112, said adaptation being controlled by the control unit 120.

Figure 5:
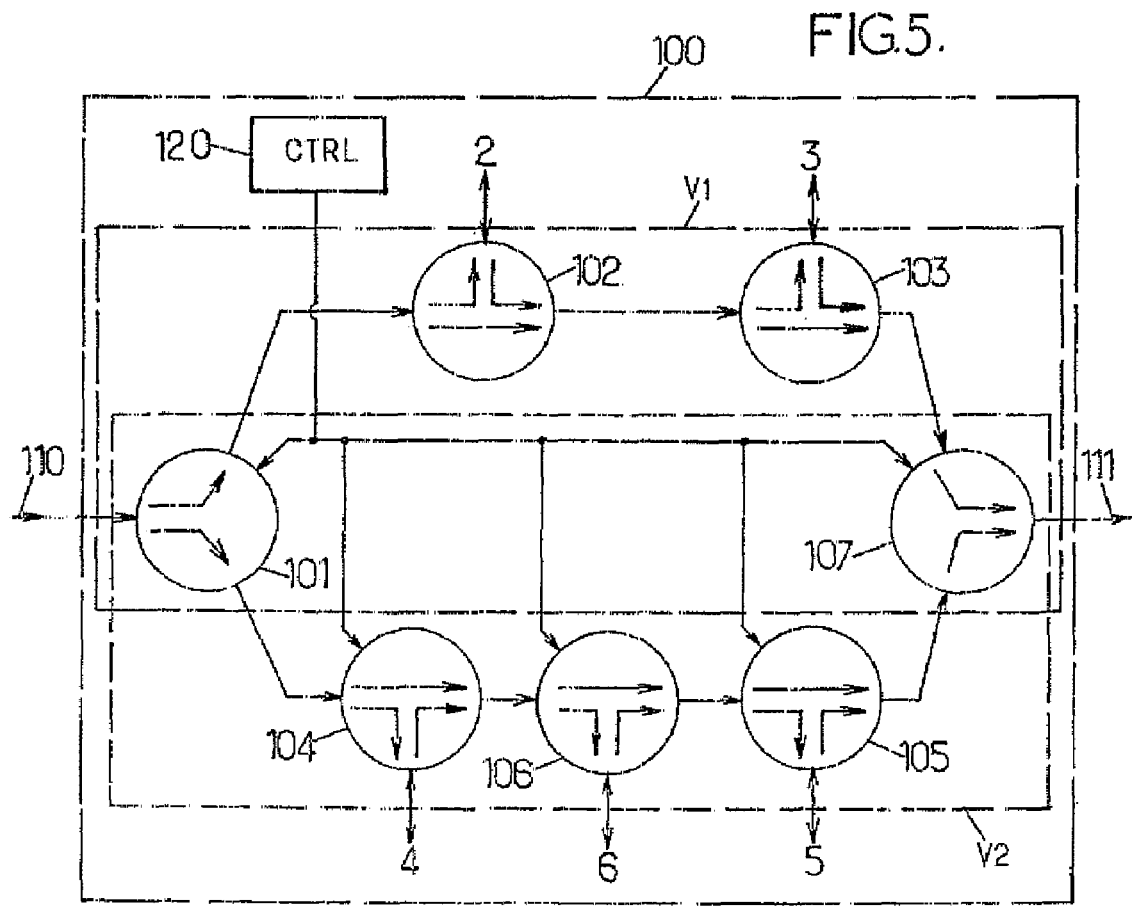
FIG. 5 is a functional diagram of a detector selection system that can be used in a detection device according to FIG. 4.

FIGS. 4 and 5 correspond respectively to FIGS. 2 and 3, for a detection device such as described previously, but incorporating five sources.

In accordance with FIG. 4, a fifth source, referenced 6, is added in the focal plane of the mirror 1, forward of the alignment of the sources 2-5, such as illustrated in FIG. 2. The source 6 is contiguous with the source 5. The focus C6 of the source 6 is situated at the distance d6 from the X'-X axis: d6 is the offset of the source 6 in the focal plane of the mirror 1.

The selection system 100 comprises an additional selector, identical to the selectors 102-105 and referenced 106 (FIG. 5). The selector 106 is connected to the source 6 by its two-way connection, and is connected at input and at output respectively to the connectors 104 and 105. The selector 106 can alternatively be connected to another location of the pathways V1 or V2. The programming of the control unit 120 is then adapted to take account of the additional source 6.

By iteration of such an addition of a source, it is understood that the principle of the invention may be applied to any number of sources placed in the focal plane of the mirror 1. The selection system 100 must then be adapted accordingly, following a similar principle to that of the adaptation just described for five sources.

Figure 6:
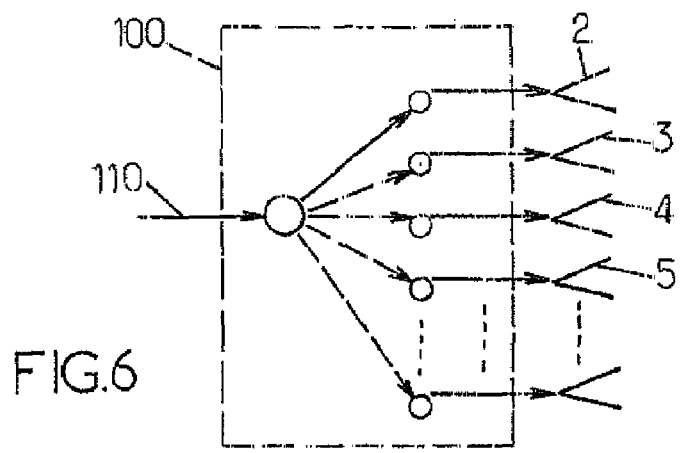
FIG. 6 illustrates the principle of the selection of a detector according to the invention.

FIG. 6 illustrates the principle of selection of a single source to determine the direction of detection of the device, in the case of any number of sources disposed in the focal plane of the mirror 1. The situation represented corresponds to the selection of the source 2 at a given instant, which is then activated (solid intermediate arrow), while the other sources 3-5, . . . are not activated at this instant (dashed intermediate arrows).

A use of a four-source radar in accordance with the invention is now described, which illustrates the implementation of a mode of detection of the ScanSar type.

Figure 7:
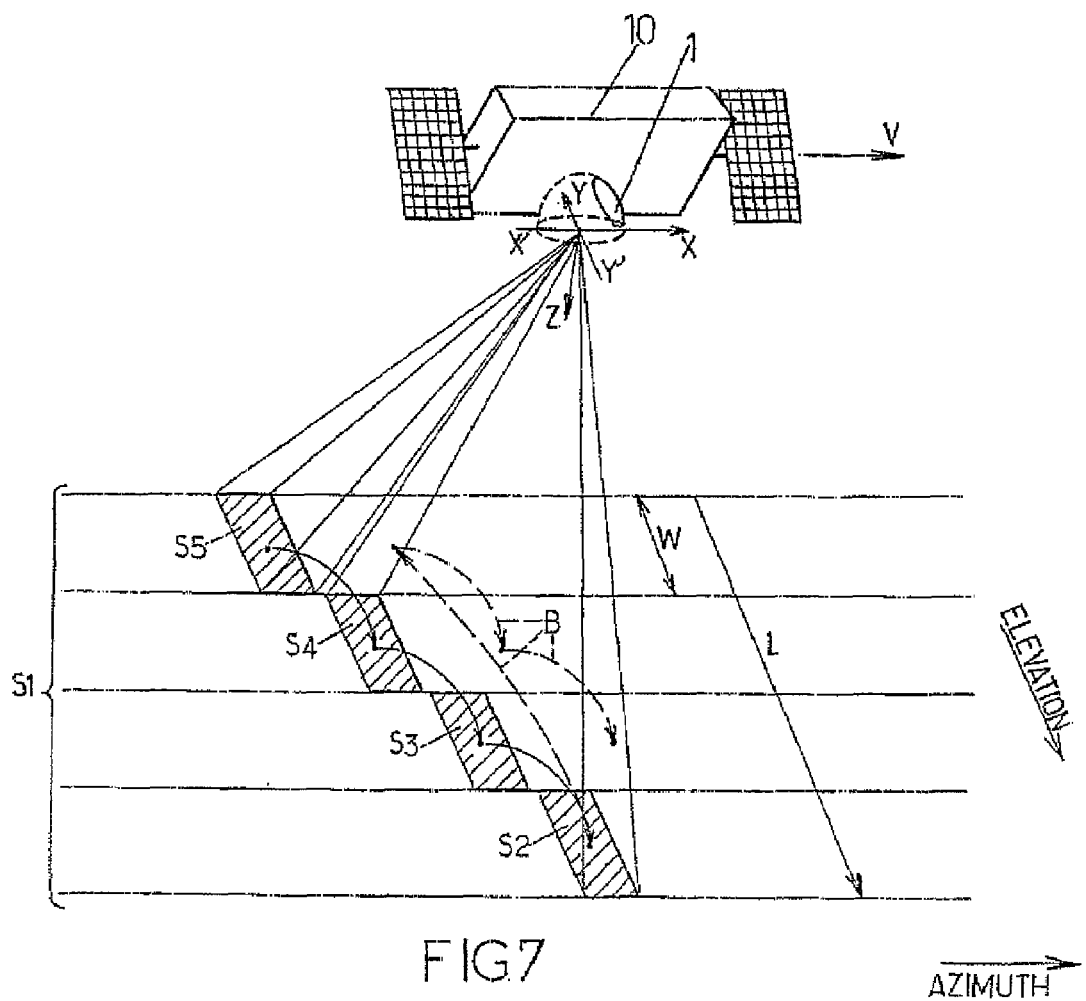
FIG. 7 illustrates a use of a detection device according to FIGS. 1 to 3.

The detection device is installed onboard an earth observation satellite 10 (FIG. 7). The satellite 10 moves with a component of speed V parallel to the surface of the earth. The azimuth direction, parallel to the component of speed V, is indicated in FIG. 7.

The direction of detection, oriented from the satellite 10 to the ground, is labeled in standard manner by the angle of elevation, perpendicular to the azimuth direction. The ground trace resulting from a variation in the angle of elevation is also indicated in FIG. 7.

The satellite 10 is oriented so that the Z'-Z axis of the detection device is substantially directed towards the surface of the earth. It is moreover oriented so that the X'-X axis of the detection device is parallel to the azimuth direction. The Y'-Y offset axis of the sources 2-5 in the focal plane of the mirror 1 is then parallel to the ground trace of a variation in elevation. Optionally, the orientation of the detection device may be adjusted with respect to the satellite by means of an appropriate orientation system ensuring the link between the mirror 1 and the satellite 10.

When the satellite 10 moves, the detection device scans a sweep Si parallel to the azimuth direction. The use of a detection device of SAR type makes it possible to obtain, in a known manner, a high effective resolution in the azimuth direction.

The selection of each of the sources 2-5 defines juxtaposed sub-sweeps referenced S2-S5, the union of which constitutes the sweep S1. The sub-sweeps S2-S5 correspond respectively to the sources 2-5 disposed in the focal plane of the mirror 1. The distance between central lines of two contiguous sub-sweeps is determined by the difference between the offsets of the corresponding sources in the focal plane of the mirror 1.

A scan B of the sweep S1 in zig-zag fashion is obtained through a succession of detection exposures in each of the sub-sweeps S2-S5. Each exposure corresponds to the selection of one of the sources 2-5. When the control unit 120 of the detection system 100 selects the sources at a sufficiently high frequency with respect to the component of speed v of the satellite, complete coverage of the sweep S1 is obtained.

Figure 8A:
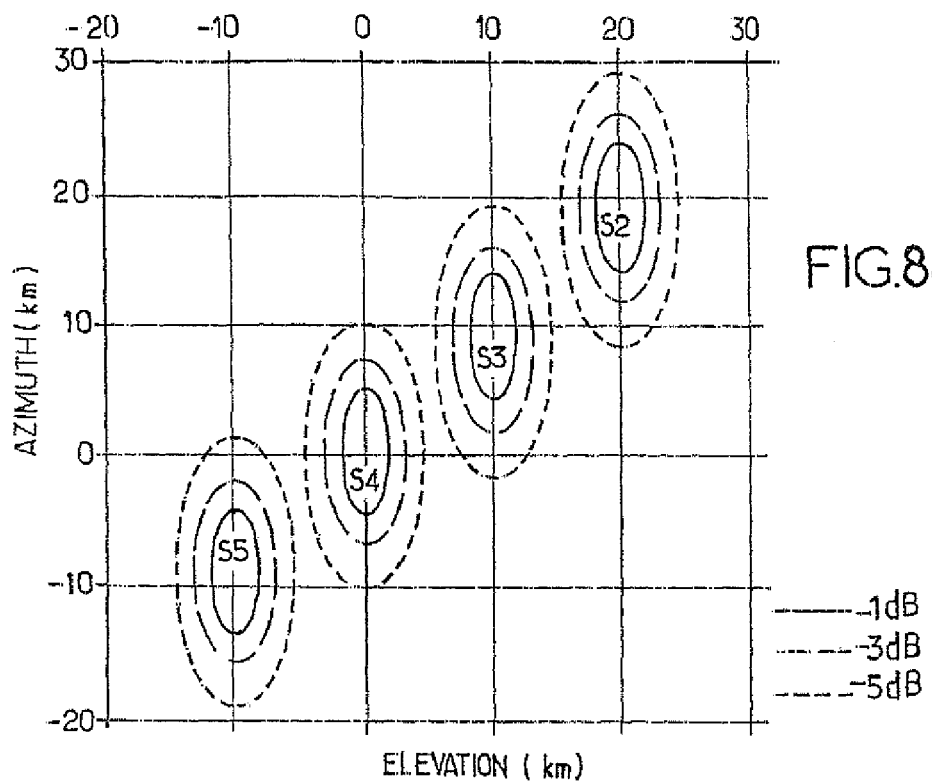
FIGS. 8a and 8b are two gain diagrams for a detection device according to FIGS. 1 to 3, corresponding to FIG. 7.

FIG. 8a is a more exact diagram of the ground field corresponding to successive exposures effected during the scan B. The axes of the diagram of FIG. 8a correspond respectively to the ground distances along the elevation direction (abscissa axis) and the azimuth direction (ordinate axis). Each field is elliptic, and exhibits dimensions which depend on the shape of the mirror 1 and the orientation of the mirror 1 with respect to a horizontal plane parallel to the surface of the ground. The ground fields are each limited by concentric envelopes corresponding to constant values of gain, respectively of −1 dB, −3 dB and −5 dB with respect to the reception gain maximum attained at the center of each field. In FIG. 8a, each field is labeled as a function of the sub-sweep S2-S5 to which it belongs.

Figure 8B:
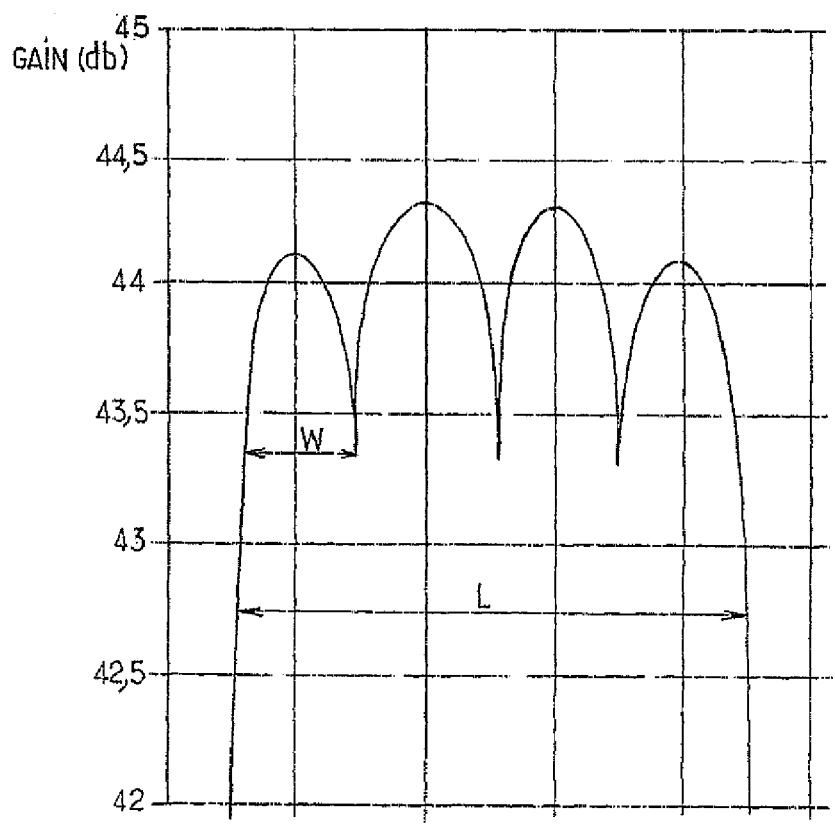

The diagram of FIG. 8b represents the variations of the reception gain in the direction of elevation. It is shown in correspondence with the diagram of FIG. 8a. The abscissa axis of FIG. 8b is a projection of the plane of FIG. 8a parallel to the azimuth direction The shape of the gain curve corresponds to cross sections of each of the elliptic fields of figure 8a. According to FIGS. 8a and 8b, the width L of the sweep S1 is around 40 kilometers and the width of each of the sub-sweeps S2-S5 is around 10 kilometers.

By virtue of the respective offsets adopted for the sources 2-5 in the focal plane of the mirror 1, along the Y'-Y axis, the reception gain diagram of figure 8b exhibits, between two successive maxima corresponding respectively to one of the sources, a gain minimum of less than around 1.0 dB at each of said maxima. The sweep S1 is then covered in the elevation direction with a quasi-uniform detection sensitivity: the various sub-sweeps are contiguous, and no "dead band" of detection exists between them. The exploration of the geographical zone is then optimal in the elevation direction This exemplary use shows the benefit of a detection device according to the invention for performing a rapid exploration of a geographic zone with a minimum number of passes of the overflight machine above this zone. It is understood that numerous modifications of the detection device may be introduced with respect to the embodiments described. Such modifications remain within the framework of the invention, insofar as several detectors are placed in the focal plane of a single parabolic mirror, so as to cover sub-sweeps juxtaposed in a continuous manner elevation-wise.

The invention claimed is:

1. A detection device comprising a parabolic mirror and several radiation detectors placed in a focal plane of said mirror, said focal plane being substantially perpendicular to an axis of the mirror and containing a focus of the mirror, the detectors being positioned with respective offsets along a determined common direction parallel to the focal plane of the mirror, the detection device furthermore comprising a selection system connected to each of the detectors and devised so as to successively select just one of the detectors and to transmit a reception signal originating from the selected detector, the respective offsets of the detectors in the focal plane of the mirror being chosen so that a reception gain diagram of said device exhibits, between two successive gain maxima in said diagram and corresponding respectively to one of the detectors, a gain minimum of less than 3.0 dB below each of said gain maxima.

2. The device as claimed in claim 1, wherein the respective offsets of the detectors in the focal plane of the mirror are chosen so that the gain minimum, situated between two successive gain maxima in said diagram and corresponding respectively to one of the detectors, is less than 1.5 dB below each of said gain maxima.

3. The device as claimed in claim 1, further comprising at least four or five detectors.

4. The device as claimed claim 1, wherein the detectors are disposed in an aligned manner in the focal plane of the mirror.

5. The device as claimed in claim 1, wherein the selection system is adapted for selecting the detectors in a cyclic manner.

6. The device as claimed in claim 5, wherein the selection system is adapted furthermore for selecting the detectors in an increasing or decreasing order of the respective offsets of the detectors.

7. The device as claimed in claim 1, adapted to operate for radar; each detector being adapted to operate for emission or reception of radiation, and the selection system being devised so as to furthermore transmit an emission signal to the selected detector.

8. The device as claimed in claim 7, adapted to operate for synthetized aperture radar.

9. The device as claimed in claim 7, wherein the selection system comprises several branches each connected to an input and to an output of the selection system, each detector being connected to one of the branches, wherein each branch comprises selectors disposed at nodes of said branch, each selector being devised so as to reproduce an emission signal intended for one of the detector on an output of said selector, selected as a function of an emission selection signal transmitted on a control input of said selector, then so as to reproduce a reception signal originating from said detector and transmitted on an input of said selector, selected as a function of a reception selection signal transmitted on the control input of said selector.

10. The use of a detection device as claimed in claim 1 on board a machine for overflying a geographical zone wherein the detection is effected.

11. The use as claimed in claim 10, wherein the detection device is oriented so that the direction of offset of the detectors in the focal plane of the parabolic mirror is substantially perpendicular to a direction of displacement of the machine.

* * * * *

UNITED STATES PATENT AND TRADEMARK OFFICE
CERTIFICATE OF CORRECTION

PATENT NO. : 7,378,629 B2
APPLICATION NO. : 10/599890
DATED : May 27, 2008
INVENTOR(S) : Goutoule et al.

Page 1 of 1

It is certified that error appears in the above-identified patent and that said Letters Patent is hereby corrected as shown below:

Column 9, Line 13 replace "ofthe" with --of the--

Column 10, Line 18 replace "detector" with --detectors--

Signed and Sealed this

Seventh Day of April, 2009

JOHN DOLL
*Acting Director of the United States Patent and Trademark Office*